Dec. 8, 1936.	E. E. WINKLEY	2,063,358
DEVICE USEFUL IN ADJUSTING CHAINS UPON AUTOMOBILE TIRES
Filed July 10, 1935
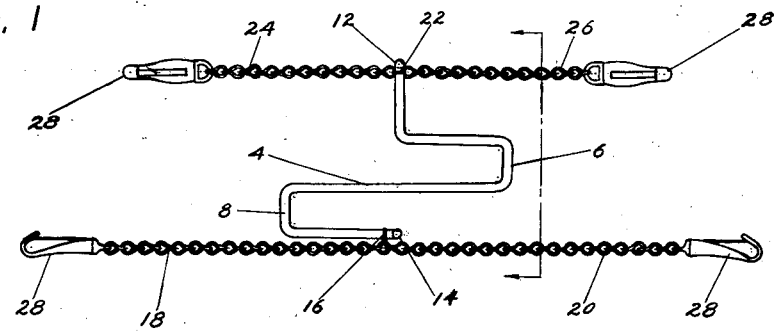
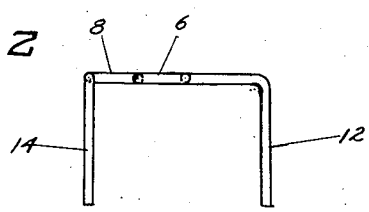
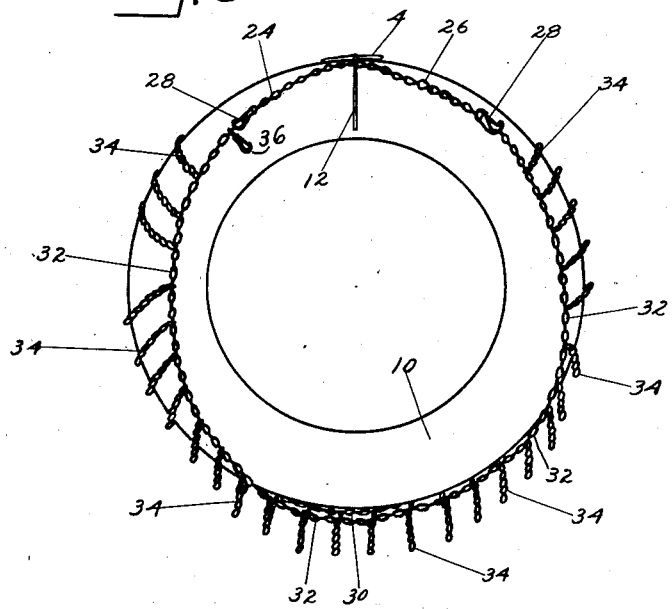
Erastus E. Winkley,
Inventor
by William H. Sellars,
Attorney Patented Dec. 8, 1936

2,063,358

UNITED STATES PATENT OFFICE 2,063,358

DEVICE USEFUL IN ADJUSTING CHAINS UPON AUTOMOBILE TIRES

Erastus E. Winkley, Lynn, Mass., assignor of one-half to William H. Sellars, East Milton, Mass.

Application July 10, 1935, Serial No. 30,715

2 Claims. (Cl. 152—14)

This invention relates to devices useful in adjusting chains upon automobile tires. However, it will be understood that the invention and various features thereof may have other applications and uses.

As heretofore constructed, devices of this kind have been restricted in their application to tires mounted upon wheels of the wire or wooden spoke types. It is an object of applicant's invention to provide a chain adjusting device of general utility and one which will be especially simple and durable in construction and highly efficient in operation.

To these ends the invention comprises a holder having tire clasping elements constructed and arranged to engage oppositely directed side surfaces of a tire with a portion of the holder resting on the tread surface of the tire. By this arrangement the adjusting device may be readily placed in position upon a tire on a wheel of any of the well-known types including the disk wheel. At the same time the holder, and hence the device, may be just as readily removed since it is engaged with the tire without being fastened thereto. As shown, the holder is made of a single piece of resilient wire and is provided with leg members adapted yieldingly to clasp oppositely facing surfaces of a tire to maintain the holder in position thereon. The device also comprises flexible attaching elements secured to the holder by which the tire chain is held preliminarily in an assembled relation to the tire to which it is to be secured.

These and other important features of the invention and novel combinations of parts will now be described in detail in the specification and then pointed out more particularly in the appended claims.

In the drawing,

Fig. 1 is a plan view from above of the devices in spread-out condition;

Fig. 2 is a view of the tire-clasping element of the device looking in the direction of the arrows in Fig. 1; and Fig. 3 is a view of the device in place on an automobile tire and attached to a chain in process of being assembled upon said tire.

In the illustrated embodiment of the invention there is provided a tire-clasping element or holder 4 which is conveniently constructed of a relatively heavy resilient wire bent in two oppositely directed loops 6 and 8 to provide a firm supporting surface to engage the top of a tire, such as that shown at 10 in Fig. 3. Besides the loops 6 and 8 the holder 4 comprises two legs 12 and 14 arranged at right angles to the plane of the loops 6 and 8 and adapted to clasp opposite sides of the tire 10, as indicated in Fig. 3, with said loops 6 and 8 resting on the tread surface of the tire. It will be clear that because of its construction the holder 4 may be readily assembled with a tire in place on any type of wheel, including the well-known disk wheel. Secured to the holder 4 at 16 is a pair of relatively long chains 18 and 20, respectively. Secured to another leg of the holder at 22 is a pair of shorter chains 24 and 26, all of the chains being provided with snap hooks 28.

As indicated in Fig. 3 a tire chain, used to prevent slipping of the tire on smooth or slippery pavements, comprises a pair of longitudinally extending chains 30, 32 having connecting crossbars or chains 34. The chains 30 and 32 are each provided at one end with a snap hook, such as that shown at 36 (Fig. 3), adapted to engage selectively with any one of the links at or adjacent to the other end of the corresponding longitudinally extending chain 30 or 32.

In utilizing the chain adjusting device of this invention, the holder 4 is first placed upon a tire, such as that shown at 10 in Fig. 3, by engaging the legs 12 and 14 of the holder with opposite sides of the tire and pressing the holder downwardly until the loops 6 and 8 thereof rest upon the tread surface of the tire. Preferably and as shown, the holder 4 is so placed on the tire 10 that the leg 12 which carries the chains 24 and 26 is nearer than leg 14 to the individual who is assembling the tire chain on the tire. This means that the long chains 18, 20 are to engage the ends of the chain 30 while the shorter chains 24 and 26 are to engage the tire chain 32. In assembling the chain on the tire, the operator will first engage a snap hook 28 on the chain 18 with a link on one end of the tire chain 30 and then a snap hook 28 on the chain 20 with the other end of said chain 30, during which operation the chains 18 and 20 are brought toward the operator and allowed to rest in part over the upper surface of the tire 10. After the snap hooks 28 have been engaged as described, the tire chain is shoved into engagement with the convexly curved downwardly directed surfaces of the tire on each side of the holder 4 as indicated in Fig. 3. Then the snaps 28 at the ends of the chains 24 and 26 are similarly engaged with the ends of the tire chain 32. At the completion of the operations just described the tire chain will be in the position shown in Fig. 3 in which it hangs loosely on the tire 10. The operator now exerts tension upon the chain 30 by moving the two ends of said chain toward each other to take up all or nearly all of the slack in said chain 30 and finally snaps the snap hook of the chain 30 (corresponding to snap hook 36 of chain 32) selectively into engagement with one of the links at the other end of the chain 30. Similarly the snap 36 at one end of the chain 32 is engaged with a link at the other end of said chain 32 in such manner as to draw the tire chain 32 into rather firm engagement with the tire 10. The snaps 28 are now disconnected from the tire chain and the device removed from the tire by lifting upwardly on the holder 4.

Having described my invention, what I claim as new and desire to secure by Letters Patent of the United States is:

1. In a device for use in assembling tire chains upon tires, a one-piece holder made of resilient wire stock and having oppositely directed loop portions to form a widely spread supporting surface for the holder by engagement with the tread portion of a tire, said holder having leg members adapted to engage oppositely facing surfaces of said tire yieldingly to clasp the tire to maintain the holder in position, and flexible members attached to said holder in pairs extending in opposite directions and having fasteners adapted to engage portions of a tire chain to hold both ends of the latter in preliminary engagement with the tire.

2. In a device for use in assembling tire chains upon tires, a one-piece holder made of resilient wire stock and having oppositely directed loop portions to form a widely spread supporting surface for the holder by engagement with the tread portion of a tire, said holder having leg members to engage with yielding pressure oppositely facing surfaces of the tire to maintain the holder in position on the tire, and flexible members attached to said holder substantially at the junction of the leg members with the tread engaging portion of the holder, and said flexible members having fasteners adapted to detachably engage portions of a tire chain to hold the latter preliminarily in assembled relation with respect to said tire.

ERASTUS E. WINKLEY.